United States Patent [19]

Pittman et al.

[11] 3,919,768

[45] Nov. 18, 1975

[54] METHOD OF TUNNEL CONTAINING STRUCTURES

[75] Inventors: Richard D. Pittman, Thousand Oaks; Norman J. Grossman, Malibu; Ronald E. Johnson, Inglewood, all of Calif.

[73] Assignee: Northrop Corporation, Los Angeles, Calif.

[22] Filed: Jan. 2, 1973

[21] Appl. No.: 320,066

[52] U.S. Cl. ........................ 29/604; 96/35.1; 96/36; 156/3; 156/217

[51] Int. Cl.$^2$ ........................ H01F 3/00

[58] Field of Search ........ 117/239, 234; 156/3, 155, 156/272, 305, 204, 217, 300; 96/35.1, 36, 36 Z; 340/174 PW, 174 VA; 29/604, 591

[56] References Cited

UNITED STATES PATENTS

| | | | |
|---|---|---|---|
| 2,967,766 | 1/1961 | Wetmore et al. | 156/155 |
| 3,448,514 | 6/1969 | Reid et al. | 340/174 VA |
| 3,769,112 | 10/1973 | Shaheen et al. | 156/3 |
| 3,771,220 | 11/1973 | Shannon et al. | 340/174 PW |
| 3,789,470 | 2/1974 | Owaki et al. | 156/3 |
| 3,823,015 | 7/1974 | Fassett | 96/36 |
| 3,843,427 | 10/1974 | Esdonk et al. | 156/3 |

*Primary Examiner*—Douglas J. Drummond
*Assistant Examiner*—Jerome W. Massie
*Attorney, Agent, or Firm*—Edward A. Sokolski

[57] ABSTRACT

A tunnel containing structure which is capable of functioning as a magnetic memory device, a circuit device, such as a fluid circuit device, or the like and which is primarily constructed from photo-resist materials using photographic techniques. The tunnel containing structure is made by depositing a photo-resist coating on a substrate surface, partially exposing the resist coating to radiation having a proper spectral distribution and thereafter immediately depositing an additional coating on the first named coating so that the two become firmly bonded together. By exposing the second coating through a mask having selected spaced apart transparent areas and developing the latter coating in response to the exposure it is possible to produce channels in the second coating. A cover member is then bonded to the upper surface of the second coating through an additional layer of photo-resist material to form the tunnels. The structure can be used in the fabrication of magnetic storage devices, for example, by inserting driving wires in the tunnels and including conductive lines such as word straps on the substrate and the cover member.

16 Claims, 11 Drawing Figures

METHOD OF TUNNEL CONTAINING STRUCTURES

BACKGROUND OF THE INVENTION

This invention relates in general to certain new and useful improvements in tunnel containing structures and the method of making the same, and more particularly, to tunnel containing structures which are fabricated primarily from photographic techniques.

In recent years, tunnel containing structures, that is, members which have a plurality of generally parallel spaced apart tunnels, have been used in the making of magnetic memory devices, and fluid circuit devices, as well as other devices functionally utilizing tunnels. The problems inherent in manufacturing tunnel containing structures are exemplified by the fabrication techniques used in the making of magnetic memory devices which utilize a plurality of spaced apart tunnels as aforesaid.

These magnetic memory devices have received widespread attention and interest in recent years, due to their application in both small and large scale memories, which are used primarily in computers, but in other applications as well. These memory devices are highly effective in memory systems due to their potential for high speed and high storage capacity when compared to other forms of memory devices, such as coated rotating drums, discs, and the like. Consequently a description of the problems inherent in making the magnetic memory device provides an indication of the problems inherent in the making of tunnel structures in general, Generally, these memory devices are fabricated by a pressing and molding technique where ferrite powder is placed in a mold having a plurality of cavities which forms the pressed material into desired toroidal shapes. These cores are then heat treated to produce a ferrite ceramic material having the required storage characteristics. This method has been successful to a limited degree, although the method is inherently limited to the production of relatively small magnetic cores.

Another technique which has been adopted for fabricating these magnetic storage devices is illustrated and described in U.S. Pat. No. 3,495,228, which relies upon a laminated construction where the storage device is built-up in stepwise fashion and incorporates a plurality of tunnels therein. In accordance with the teaching of this patent, magnetically coated filaments are arranged between two opposed sheets of insulating material. On the mutually facing sides thereof are electrical conductors which are orthogonal to the filaments. In making the storage device, the two sheets of insulating material are bonded together with stretchable filaments in place of the magnetically coated wire filaments. After the insulating sheets have been bonded, and the bonding agent cured, the stretchable filaments are withdrawn and the magnetically coated filaments of slightly reduced diameter are then inserted in the tunnel-like apertures left after removal of the stretchable filaments. Terminal portions of the sheets are folded back upon the main body of the laminate to facilitate making electrical connections to the conductors.

Another prior art technique which has been adopted for the making of these magnetic storage devices is taught in U.S. Pat. No. 3,460,113. This technique involves the fabrication of an insulating base plate having a plurality of parallel grooves. The surface of the base plate is finished by a suitable treatment such as lapping, and thereafter an insulating film having a plurality of parallel driving wires is bonded to this surface on the plate so that the parallel driving wires intersect the grooves, thereby producing a matrix plate. Two of these matrix plates are joined together to hold a memory wire in each hole formed by a pair of confronting grooves in the two matrix plates.

The above described techniques for making magnetic memory devices utilizing tunnels for accommodating wires are only examplary of a number of fabricating systems which are extant in the prior art, and reference may also be made to U.S. Pat. Nos. 3,392,441; 3,538,599; and 3,600,800, which all disclose other forms of making magnetic memory devices.

However, these various prior art fabricating techniques have not been very successful in the production of extremely small storage devices which exhibit in reproducable form very high quality storage characteristics which are necessary to achieve the desired high speed operation in large scale memories. The output signals which are generated in the operation of these devices are relatively small, typically in the order of a few millivolts, and it is therefore important to achieve a high degree of uniformity in the spacings between successive wires when arranged in parallel arrays to form a matrix. Other variations in coupling between the wires and crossing conductors at different points along the length of the wires will oftentimes tend to introduce errors into the system. It is, however, highly desirable to space the wires employed in these memory devices as closely together as possible in the interest of space conservation.

As indicated, the problems encountered in the manufacture of magnetic memory devices is representative of many of the problems inherent in the making of other tunnel containing structures. For example, in the manufacture of fluid circuits, which may also be used in computers and other circuit applications, it is necessary to produce a structure with a plurality of tunnels having a relatively small cross-sectional shape and providing a high degree of accuracy and reproducability. However, the various techniques mentioned above inherently introduce a number of variables in the manufacture of the devices and hence reproducability is not very good. Furthermore, the techniques mentioned above also require substantial amounts of costly labor time and high tooling costs.

It is therefore the primary object of the present invention to provide a tunnel containing structure which is relatively simple in its construction and inexpensive to manufacture.

It is another object of the present invention to provide a method of fabricating a tunnel containing structure which primarily employs photographic processes and thereby eliminates costly fabricating techniques such as drilling, casting, machining, and the like.

It is also an object of the present invention to provide a method of fabricating a tunnel containing structure of the type stated, which involves a minimum amount of manual labor and requires relatively small tooling costs.

It is an additional object of the present invention to provide a method fabricating a tunnel containing structure of the type stated which is adaptable to highly efficient mass production operation.

It is a further object of the present invention to provide a magnetic memory device utilizing the tunnel containing structure of the type stated which is capable of large power outputs with a high degree of uniformity.

With the above and other objects in view, our invention resides in the novel features of form, construction, arrangement, and combination of parts presently described and pointed out in the claims.

GENERAL DESCRIPTION

Generally speaking the present invention resides in the method of making a three dimensional structure of selected size in each dimension and where the structure is formed of a polymerizable radiation activatable material. This method comprises the depositing of a first layer of a radiation active material on a substrate and briefly exposing the first layer to a source of radiation which has a spectral distribution compatible with the spectral response of the radiation active material. Immediately thereafter, a second layer of radiation active resist material is deposited on the first layer to permit copolymerization of the two layers between the interface therebetween to thereby permanently bond the two layers. The second layer has selected portions thereof selectively exposed to a source of radiation which also has a spectral distribution compatible with the spectral response of the material in the second layer. This second layer is then treated with an agent capable of removing portions thereof responsive to exposure of the second layer to the source of radiation.

In more detail the method of the present invention can be further characterized in that the method includes the bonding of an additional member to at least one exposed surface of the second layer. In this connection, it should be observed that a plurality of layers of this radiation active material could be bonded one upon another to build up a structure of desired size. After one layer is deposited and partially exposed, the next layer is deposited on one planar surface thereof just as polymerization of the material in the first layer begins and in this way the two layers will copolymerize through the interface therebetween substantially effectively eliminating this interface.

The second layer mentioned above is exposed to the source of radiation through a mask which permits exposure of only selected portions thereof. Furthermore, the treating of the resist material comprises washing the resist material in a solvent so that the unexposed portions are washed away.

The fabricating method of the present invention may also be used in the formation of devices which contain tunnels, such as magnetic storage devices, manifolds with various sizes and shapes of conduits therein, or molds for various uses. Thus, in this aspect of the present invention, the method includes the making of the device having a plurality of spaced-apart channels therein. In accordance with this method, a radiation active resist material is coated on one planar surface of the substrate having a pair of opposite planar surfaces. Thereafter, spaced-apart selected areas of the resist material are exposed to a source of radiation to harden the exposed portions. The resist material is then treated with an agent capable of removing certain portions responsive to the exposure to the source of radiation, namely the unexposed and unhardened portions, to thereby form a plurality of spaced-apart recesses which are separated by a plurality of spaced-apart ridges. These recesses have bottom walls extending between the ridges which are substantially parallel to the first named planar surface. A bonding material is then coated on one of the planar surfaces of the cover member. The cover member is then bonded through this last named bonding material to the outwardly presented surfaces of the ridges to form tunnels with these recesses. This device can be used in any of the ways described above.

This method of making the tunnel containing device can be further characterized in that the surface of the cover member which is bonded to the outwardly presented surfaces of the ridges is first coated with a similar radiation active resist material and exposed to a source of radiation prior to the bonding of the cover member to the ridges.

In a preferred aspect of the present invention, a first relatively thin coating of the radiation active resist material is applied to the planar surface of the substrate and partially exposed to a source of radiation for a relatively short duration. Thereafter, a second coating of radiation active resist material, which is substantially thicker than the first coating, is applied and exposed to the source of radiation through a mask. The mask is designed to expose the selected areas of the resist material which then become hardened when exposed to the source of radiation. After exposure, the resist material is treated, generally in a solvent bath, and the unexposed portions which are unhardened are then washed away.

The radiation sensitive resist material is preferably a photographic resist material which is sensitive to ultra-violet light. After the second coating of the resist material is exposed to the ultra-violet light and the unhardened portions are washed out, the structure is baked to bond or completely homogenize the interfaces between the exposed second photo resist coating and the first activated coating, which leave three-sided grooves.

The substrate and the cover member may be of a rigid or a flexible construction. The cover member is then secured to the upper surfaces of the ridges through the application of mild pressure and heat, and in this way, the resist material on the cover member completely bonds integrally with the upper surfaces of the ridges which extend between the grooves and thereby forms tubular channels or tunnels with these grooves.

As indicated previously the tunnel containing members of the present invention are capable of being very effectively used in the fabrication of magnetic storage devices or memory devices. In general terms the method of fabricating these memory devices can be described as coating a radiation active resist material on one planar surface of a substrate which also has a plurality of electrical conductors on one planar surface thereof. Thereafter, a plurality of spaced-apart selected areas of this resist material is exposed to a source of radiation in such manner that these exposed selected areas are angularly located with respect to the electrical conductors. After exposure, the resist material is treated with an agent capable of removing certain portions of the resist material responsive to exposure to the source of radiation, and in this way form a plurality of spaced-apart recesses which are separated by a plurality of spaced-apart ridges. These ridges and the bottom walls of the recesses which extend between the various ridges are substantially parallel to the first named planar surface on which the resist material is coated, and furthermore, are angularly located with respect to the electrical conductors. A cover member having a plurality of electrical conductors thereon is bonded to the outwardly presented surfaces of the ridges to form tunnels with these recesses. Furthermore, the cover member is located so that the conductors on the cover member and the conductors on the substrate are in substantial registry. These electrical conductors on both the cover member and the substrate are electrically connected through some form of electrical connection and electrically conductive elements are inserted in the tunnels thus formed.

The method of making the magnetic storage device can be characterized in more detail in that the grooves and hence the tunnels formed in the device extend in a perpendicular arrangement to the conductors on the substrate and the cover member. The substrate and the cover member are preferably circuit boards so that each is provided with a set of parallel spaced-apart conductors on at least one planar surface thereof. These conductors will serve as word straps in the finally assembled device. In addition, an individual magnetically coated wire is inserted in each of the tunnels which serve as driving wires or so-called "sense" wires in order to complete this portion of the device.

Three embodiments of a tunnel containing structure in the form of magnetic storage devices are disclosed in detail herein. In one embodiment of the magnetic storage device, "word straps" will be located on the exteriorly presented surfaces of each of the circuit boards in the finally assembled devices. In another embodiment of the magnetic storage device the "word straps" will be located on the interiorly presented surfaces of the circuit boards in the structure thus formed. In this latter embodiment, the photo-resist coating is placed on the planar surface of the first circuit board which includes the conductors thereon. In like manner, the cover member, also in the form of a circuit board, will have the coating applied to that surface which also includes the conductors thereon.

In a further embodiment of the present invention, the cover member is actually integral with the substrate and is initially substantially coplanar therewith so that the cover member and substrate are formed from one circuit board. The substrate portion of the circuit board is formed in the manner as previously described in one operation, and that portion of the circuit board which constitutes a cover member is also prepared as described above. The cover member portion is thereafter folded over so that the coated surface of the cover member portion engages the upper surfaces of the ridges thus formed on the circuit board substrate and thereafter bonded to form the tubular tunnels. When the magnetically coated wires which serve as the driving wires are introduced into the tunnels, the structure includes single turn "word straps" which are then looped around the various driving wires contained in the tunnels.

In general terms, the magnetic memory device, which can be produced in accordance with the present invention, can be described as comprising a substrate having a pair of opposed flat planar surfaces. A plurality of first spaced-apart electrical conductors are located on one of the flat planar surfaces of this substrate. An electrically insulative member is also located on one of the flat planar surfaces of the substrate and this insulative member is preferably formed of a radiation active material such as the photo-resist material mentioned above. The insulative member is provided with a plurality of grooves which are substantially parallel to the last named planar surface of the substrate and these grooves are also angularly located with respect to the electrical conductors. An electrically conductive element, which serves as a driving wire, is located in each of the grooves. A cover member is disposed over the grooves and engages the ridges and is bonded to the upper surfaces of the ridges formed on the insulative member. In like manner, a plurality of spaced-apart electrical conductors are also located on the cover member and lie in substantial registry with the first named electrical conductors. Means is provided for connecting the first and second sets of electrical conductors.

In more detail, the device of the present invention can be characterized in that an electrically insulative bonding layer formed of the radiation active material is interposed between the cover member and the insulative member and the cover member is bonded to the upper surfaces of the grooves on the insulative member through this bonding layer. The electrically conductive elements mentioned above are also preferably coated with a magnetic type material to serve as the driving wires. In this case, the conductors on the cover member and on the substrate will serve as word straps. Again, the cover member and the substrate are preferably printed circuit boards In one embodiment of the present invention, the electrical conductors are located on the exteriorly presented surfaces of the cover member and the substrate, and in another embodiment of the present invention, the electrical conductors are located on member in the structure thus formed.

In yet a further embodiment of the present invention, the cover member is integral with the substrate and is initially coplanar therewith. After formation of the cover member and the substrate with the channels therein as previously described, the cover member portion is bent over the substrate and bonded to the upper surfaces of the ridges to thereby form the tunnels which are capable of receiving the driving wires.

As indicated previously, the tunnel containing structures of the present invention and the method of making the same can be used in a wide variety of applications. Three embodiments of the tunnel containing structures are illustrated in the drawings and described in more detail in the form of magnetic storage devices. However, it should be understood that the devices thus constructed could be suitable made in the form of fluid circuits for example, where the tunnels would serve as fluid conduits or fluid circuit lines. In this latter application, the various word strap conductors and the driving lines would be eliminated. In addition the device in absence of the various conductive elements, could be effectively employed as a manifold in various applications.

FIGURES

Having described the invention in general terms, reference will now be made to the accompanying drawings, in which three embodiments of the tunnel containing structure in the form of a magnetic storage device are illustrated and described. In the accompanying drawings:

FIGS. 5 through 8 are schematic vertical sectional views showing one method of fabricating a magnetic storage device in accordance with the present invention, and of which:

FIG. 5 is a vertical sectional view showing the application of a first photo-resist coating to a circuit board substrate followed by the application of radiation thereto;

FIG. 6 is a vertical sectional view showing the application of a second coating of a photo-resist material to the first coating of like material and the application of radiation thereto through a mask;

FIG. 7 is a vertical sectional view showing the formation of grooves in the second photo-resist coating after exposure and further treatment;

FIG. 8 is a vertical sectional view showing the application of a photo-resist coating to a circuit board cover member with the application of radiation thereto;

DETAILED DESCRIPTION OF MAGNETIC STORAGE DEVICES

Figure 1:
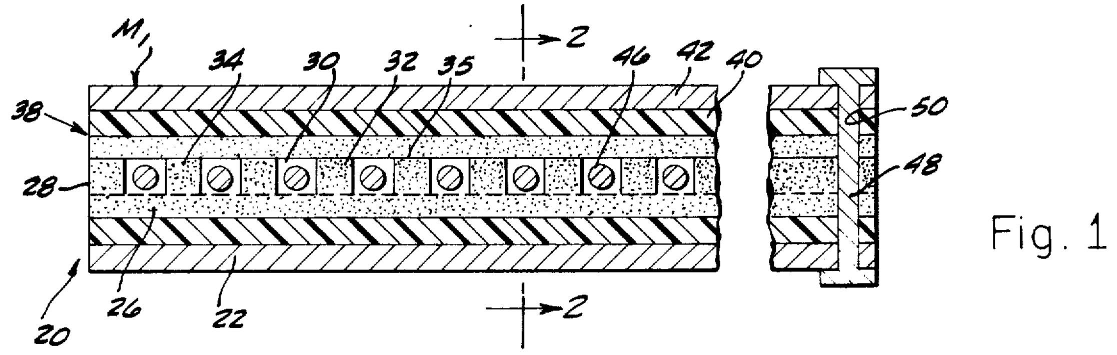
FIG. 1 is a vertical sectional view, partially broken away, of a magnetic storage device which is constructed in accordance with and embodying the present invention.
Figures 2, 3, 4, 9:
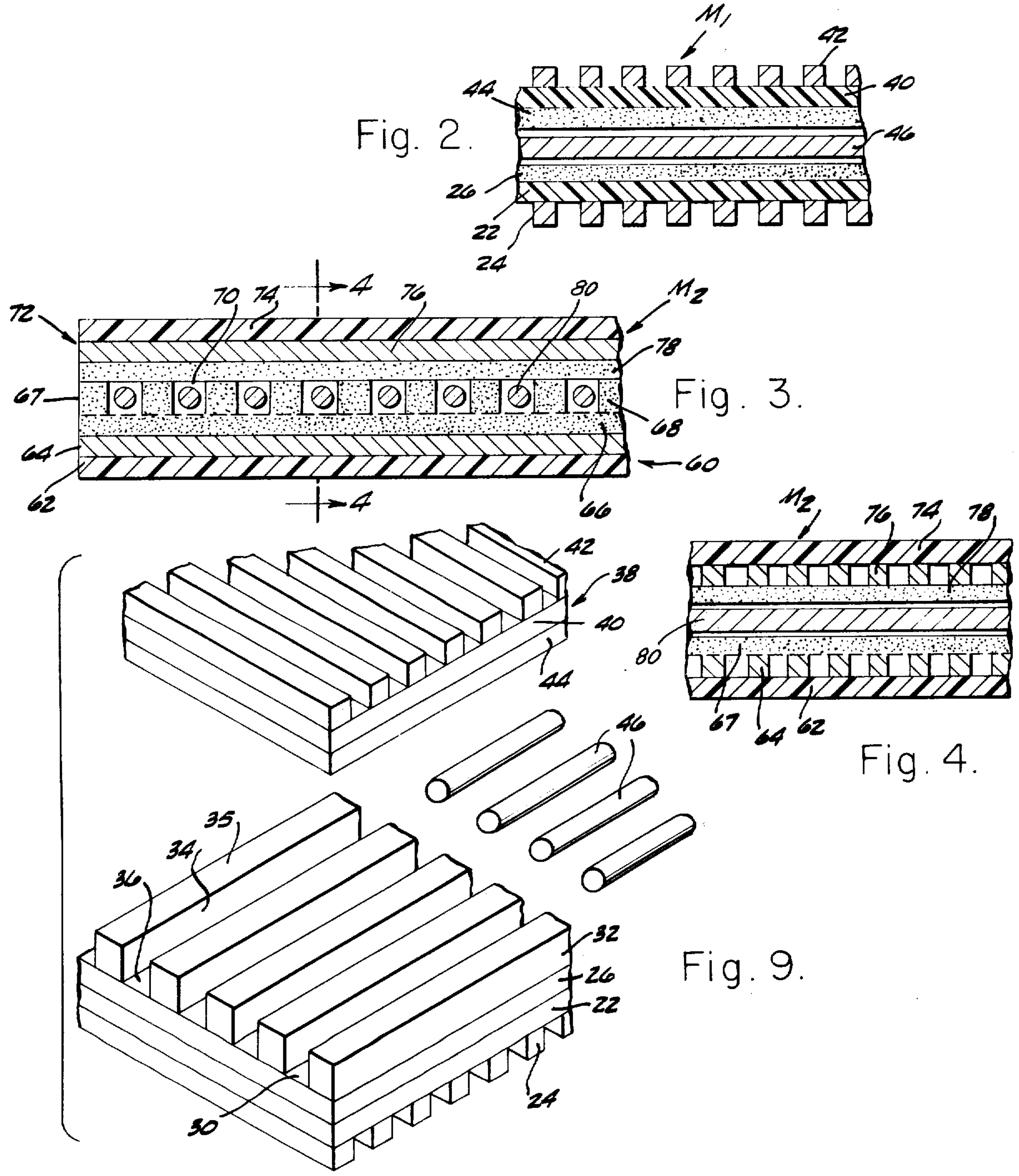
FIG. 2 is a fragmentary vertical sectional view taken along line 2—2 of FIG. 1.
FIG. 3 is a vertical sectional view similar to FIG. 1, and showing a modified form of magnetic storage device constructed in accordance with and embodying the present invention.
FIG. 4 is a fragmentary vertical sectional view taken along line 4—4 of FIG. 3.
FIG. 9 is an exploded perspective view showing the method of securing the cover member to the printed circuit substrate to thereby form tunnels within the composite structure, and the insertion of conductive elements into these tunnels.

Referring now in more detail and by reference characters to the drawings which illustrate practical embodiments of the present invention. $M_1$ designates one embodiment of a tunnel containing structure in the form of a magnetic storage device. This storage device $M_1$ comprises a circuit board substrate 20, such as a so-called "printed" circuit board. These circuit boards 20 generally include a support plate 22 and a plurality of spaced-apart longitudinally extending parallel conductive strips 24 on one surface thereof, in the manner as illustrated in FIGS. 1 and 2. The circuit boards 20 are preferably formed of a glass-epoxy composite such as fiberglass mat suitably impregnated with an epoxy or similar resin material and cured. However, other plate formations could be employed in accordance with the present invention and include polyimids, any numbers of polyesters, such as "Mylar" or essentially any other material having a film property. In this connection the circuit boards may be made of a rigid or a flexible construction.

The conductors 24 are preferably formed of gold coated copper strips which are suitably embedded on the bottom face of the plate 22. These conductors 24 serve as "word straps" in the finally assembled memory device and generally have a width of about four mils. Furthermore, in a preferred aspect of the present invention the word straps 24 are approximately four inches in length and are spaced from each other by approximately three and one-half mils. Again, it should be recognized that other materials can be used in the formation of the word straps, and include for example, nickle coated copper, or copper-solder, or the like.

A relatively thin insulating material coating 26 preferably formed of a hardened photographic resist material and which serves as a bonding layer is deposited on the upwardly presented surface of the support plate 22 in the manner as illustrated in FIGS. 1 and 2. This material is partially set or activated through exposure to ultra-violet light, in a manner to be hereinafter described. After exposure and partial setting, the coating 26 is immediately coated on the upwardly presented surface thereof with a relatively thicker coating 28 of a similar resist material which serves as an intermediate insulating member. In accordance with the photographic fabricating technique described hereinafter, a plurality of parallel spaced-apart tunnels 30 are formed in the intermediate member 28 and extend perpendicularly with respect to the word straps 24. Each of the tunnels 30 are formed by a pair of spaced-apart ridges 32 where each ridge includes a pair of vertically disposed side walls 34 connected by laterally extending top walls 35. Extending between each of the ridges 32 is a relatively flat horizontal wall 36 which together with the side walls 34 of the two ridges form three sides of a tunnel 30.

A cover member 38 is thereafter secured to the upwardly presented surfaces of the top walls 36 in the manner as illustrated in FIG. 1 and thereby forms the fourth wall of each of the tunnels 30. The cover member 38 is also fabricated from a circuit board of the type used in the circuit board substrate 20 and may be made of any of the materials of construction used in the circuit board 20. This circuit board used in the cover member 38 also comprises a support plate 40 having a plurality of spaced-apart substantially parallel longitudinally extending conductors 42 which also serve as word straps. Furthermore, by reference to FIG. 2, it can be observed that the word straps 42 are substantially of the same size as the word straps 24 and are marginally registered therewith. In like manner, the word straps 42 are preferably formed with the same electrically conductive material as the word straps 24. Deposited on the opposite planar surface of the support plate 40 is a coating 44 of a photo-resistive insulating material which serves as a bonding layer. The photo-resist material used in the coating 42 is preferably similar to the material used formation of the insulative member 26. The cover member 38 is thereafter bonded to the top walls 36 of the ridges 32 through this bonding layer 44.

After the entire structure is assembled as described, conductive elements 46 which serve as "driving wires" are inserted into each of the tunnels 30. The driving wire 46 is preferably formed of a high electrically conductive material such as copper or beryllium-copper wire. The wire is thereafter plated with a suitable magnetic material such as an iron-nickel alloy. Generally, a good magnetic film which may be used as a coating on the conductive elements 46 is a permalloy composition having approximate portions of eighty percent nickle and twenty percent iron. This film is preferably continuous and is deposited in a manner to establish a magnetic anisotropy axis, or a preferred magnetization direction circumferentially around the wire. This axis is often referred to as the "easy axis" of the wire.

The conductors or word straps 24 and 42 which are located on the exteriorly presented surfaces of the two circuit boards support plates 22 and 40, respectively, in accordance with the method of construction described herein are suitably electrically connected by any form of electrical connecting means, thus electrical conductors such as pins 48, which are formed of an electrically conductive metal, may be inserted within vertically located apertures 50 formed in the stacked components. These pins 48 each contact an upper word strap 42 and an associated lower word strap 24 to form electrical conductivity therebetween. Another form of electrical connection which may be used in accordance with the present invention relies upon plating the annular wall forming each of the apertures 50 with an electrically conductive material which lies in electrical contact with both the associated upper and lower word straps. It should be recognized, however, that any other form of electrical connection could be used in order to provide electrical connection between the various upper and lower word straps in accordance with the present invention.

Figure 5:
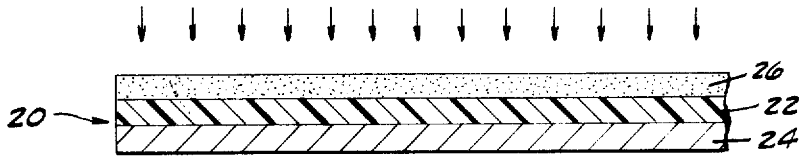

The method of making the magnetic storage device $M_1$ is more fully illustrated in FIGS. 5 through 9. Referring to FIG. 5, it can be seen that the printed circuit board 20 is provided on its upwardly presented planar surface with a relatively thin coating of a photographic resist material which forms the insulating and bonding layer 26. This coating is relatively thin with an approximate thickness of about 0.6 mils, although the coating could be as thick as 20 or more mils and as thin as 5.0 to 10.0 millionths inches, depending upon the intended application of the device. Actually, the thickness of this layer 26 is not critical to the present invention. The coating may be applied by any suitable technique, such as by brushing or other techniques known in the art.

One of the most effective photographic resist coatings which has been found to be useful in accordance with the present invention is an acrylate photoelectric polymeric material commercially offered by the du-Pont deNemours & Co. under the trade name RISTON. However, it should be observed that other photographic resist coatings, such as the photopolymer commercially offered under the tradename "Laminar" by the Dynachem Corporation of Santa Fe Springs, Calif. may also be used in the present invention. These photoresist coatings are generally photopolymers and may be applied as liquid coatings or dry film coatings. The fabrication of dry film photoresists is more fully described in U.S. Pat. No. 3,469,982, dated Sept. 30, 1969.

After the coating 26 of the photographic resist material has been applied to the surface of the circuit board 20, the board is then exposed to a source of radiation which is reactive with the photographic resist material. In the case of the RISTON photographic coating, it has been found that ultra-violet light within a wave length range of approximately 4000 angstroms has been found to be highly effective. The light source which is employed will of course vary, depending upon the type of photographic resist coating which is employed. The source of light or other radiation will be selected to have a spectral peak which is compatible with the resist material. The coating which forms the insulating layer 26 is only exposed to the light source for a relatively short duration, such as, for example, approximately five to ten seconds, in order to only partially set or "activate" the coating, although the exposure time will depend upon a number of factors including the thickness of the coating.

Immediately after partially setting the coating forming the layer 26, a relatively thicker coating 28 of similar photographic resist material is applied to the upper surface of this layer 26. This latter coating which forms the intermediate member 28 is applied in a thickness of approximately 4 mils, although this latter coating may also be as thick as twenty or more mils or it may be as thin as the coating which forms the bonding layer 26. Some allowance should be made, however, for shrinkage during the polymerization process. The structure is then baked for approximately 5 minutes to approximately 30 minutes at a temperature between the range of about 80°F to about 100°F to completely homogenize the interface between the coatings 26 and 28.

Figure 6:
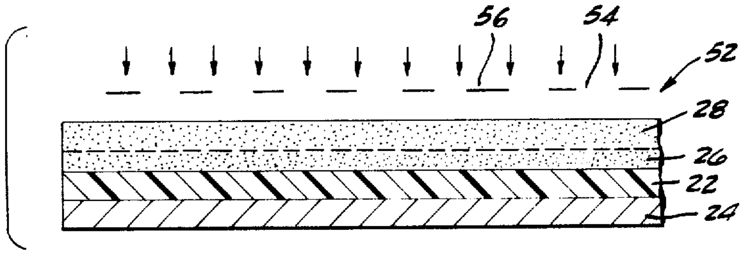
Figure 7:
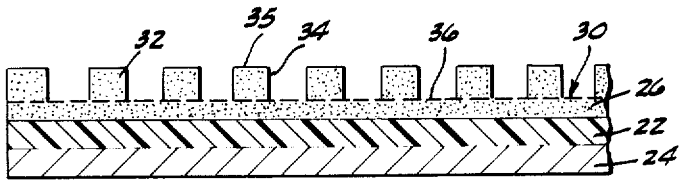

This latter coating 28 is thereafter exposed to the source of ultra-violet light through a suitable mask 52 in the manner as illustrated in FIG. 6, in order to expose selected areas of this coating. It can be observed that the mask 52 is provided with a plurality spaced apart rectangularly shaped transparent areas 54 which are separated by a plurality of spaced apart rectangularly shaped opaque areas 56.

The radiation which passes through the transparent areas 54 will impinge upon the resistive coating 28 and thereby harden those portions or selected areas of the coating. The remaining portions of the coating which are not subjected to the ultra-violet radiation will not set or harden and are therefore soluble in a selective solvent. After exposure to the light source, the coating 28 may be "developed", that is the coating is subjected to a washing treatment in which the non-exposed and soluble portions of the coating are absorbed by a suitable liquid solvent solution. In this way, the ridges 32 are formed in those selected areas of the coating 28 which receive the ultra-violet radiation and the tunnels 30 are formed in those areas which did not receive the radiation from the light source. It can be observed that the mask 52 is oriented so that the selected areas in which the ridges 32 are formed and hence the tunnels 30 separated by the ridges 32 will be perpendicularly arranged with respect to the conductors 24, to thereby form the structure illustrated in FIG. 7.

The solvent which is used in the washing treatment of so-called "development" will depend upon the type of photo-resist material which is selected for use in the present invention. In the case of the Riston coating for example, a very effective solvent is 1,1,1-trichlorethane. Solvents which are effective for use in development of some of the known photo-resist materials include for example, tricholorethylene, xylene and other xylene based solvents.

The type of developing procedure adopted will depend in large measure on the type of photo-resist which is used in the process of the present invention. Generally, the structure having the exposed photo-resist coating is immersed in the solvent and agitated during the developing operation. When fabricating memory devices and other structures having relatively small tunnels therein, it is often desirable to agitate the solution with the application of ultrasonic energy in order to achieve proper cavitation. However, other forms of developing procedures could be adopted and include the use of a pressure spray or any combination thereof with pre-washing or pre-soaking in the solvent solution. Normally the development operation is completed in about 60 to about 120 seconds, although the exact development time will depend upon the materials used as the photo-resist, the solvent and the respective sizes of the channels or tunnels.

The fabrication of a structure having a plurality of channels which are ultimately formed into tunnels is highly effective in accordance with the present invention in that the structure is formed of a photoresist material through the application of photographic teachniques. In this connection, it can be observed that the second coating 28 is applied immediately after exposure and partial activation of the coating 26 so that copolymerization occurs between the two layers. In this way the two coatings become integrally bonded with an almost complete elimination of the interface therebetween. It should be observed that even additional layers could be deposited on the second coating 28 and one or more of these additional layers could also be provided with channels or tunnels created by selective exposure and development as described herein. In some cases it is possible to eliminate the lower bonding layer 26 so that the second coating 28 is applied directly to the substrate. However, in the preferred aspect of the present invention, the intermediate bonding layer 26 is employed to prevent any reactivity between the second coating 28 and the base layer and to build up a layer upon which the ridges are firmly bonded.

Figure 8:
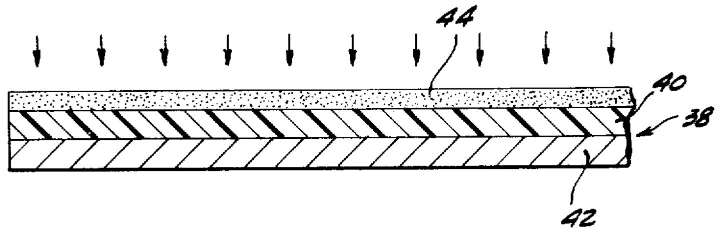

The cover member 38, which is more fully illustrated in FIG. 8, is constructed by applying the photo-resistive coating 44 to the upwardly presented planar surface of the circuit board support plate 40 to form the bonding layer 44. The circuit board used in the fabrication of the cover member 38 is substantially identical in construction to the circuit board which is used as the substrate 20. Furthermore, the photo-resistive coating which forms the bonding layer 44 is also applied in a manner similar to the application of the photo-resistive coating forming the insulative bonding layer 26. After application, this photo-resistive coating 44 is exposed to a source of ultra-violet radiation for a brief period, generally within the range of approximately 5 seconds to approximately 10 seconds for purposes of partially activating and setting the coating. Immediately thereafter, the cover member 38 is inverted and disposed on the top walls 35 of the various ridges 32 and bonded thereto. During the bonding process, the composite assembly may be subjected to heat generally within the range of about 80° to about 100°C for about 5 to 30 minutes, and the cover member 38 may be held on the top walls 35 of the ridges 32 under pressure, generally with about 5 psi or less during the bonding operation. In this way, a permanent bond is secured between the cover member 38 and the remaining structure. The cover member 38 will also provide the fourth wall for each of the various tunnels 30 which are of rectangular shape in cross-section and are open-ended.

After completion of the bonding operation, the various apertures 50 are drilled or otherwise formed in the regions of the registered upper and lower word straps 24 and 42 and the pins 48 are inserted in these apertures 50 (FIG. 1). In this way each pin 50 forms a conductive connection between each associated and registered upper and lower word strap. The pins 48 may be snuggly and retentively held in the various apertures 50, or they may be retained therein by means of locking nuts or the like. Other forms of electrical connection may be employed and include for example, jumper wires which are attached to respective ones of upper and lower word straps and extend through the apertures. In a preferred aspect of the present invention the interior surface of the apertures may be plated with an electrically conductive material which is in electrical contact with the upper and lower word straps as aforesaid.

It is possible to provide a magnetic memory device $M_2$, which is more fully illustrated in FIGS. 3 and 4, and which is similar in construction to and fabricated in a manner similar to the magnetic memory device $M_1$. The magnetic memory device, $M_2$, also includes a circuit board substrate 60 which is similar to the circuit board substrate 20 and includes a substrate plate 62 having a plurality of spaced-apart parallel longitudinally extending conductors 64 serving as word straps on one planar surface thereof. Unlike the memory device $M_1$, a photo-resistive coating is applied to the same planar surface of circuit board 60 which includes the word straps 64 to thereby form a insulative bonding layer 66. The second coating of photo-resistive material which forms the insulative intermediate layer 67 is also applied to this layer 66 after partially setting the latter. The remaining portion of the circuit board substrate 60 is fabricated in the manner as previously described to thereby form ridges 68 separated by a plurality of longitudinally spaced transversely extending tunnels 70. Again it should be observed that the tunnels 70 are perpendicularly arranged with respect to the conductors 64.

A cover member 72 which also includes a support plate 74 having a plurality of spaced-apart parallel longitudinally extending conductors 76 is also provided in the magnetic memory device $M_2$. These latter conductors 76 will also serve as word straps and will be substantially parallel with and lie in substantial registry with the word straps 64 in the finally assembled device. A photo-resistive coating which forms a bonding layer 78 is also applied to the same planar surface of the cover member support plate 74 which includes the word straps 76. After partially activating this latter layer 78 by brief exposure to ultra-violet radiation in the manner previously described, the cover member 72 is inverted and disposed on the upwardly presented top walls of the ridges 68. The cover member 72 is then bonded through the bonding layer 78 to the top walls of the ridges 68 under the application of heat and pressure in the manner as previously described. Driving wires 80, similar to the previously described driving wires 46, are thereafter inserted in each of the tunnels 70 formed by the various ridges 68 along with the cover member 72. Furthermore, the conductors 64 and 74 would also be connected by some form of conductive assembly similar to that employed in the memory device $M_1$.

In this form of construction, it is oftentimes desirable to imbed the electrical conductors which form the word straps in the plate 72 so that the printed circuit side of the board is relatively smooth. This latter form of magnetic memory device, $M_2$, is quite effective in many applications in that it is oftentimes desirable to locate the word straps in relatively close proximity to the driving or sense wires.

Figure 10:
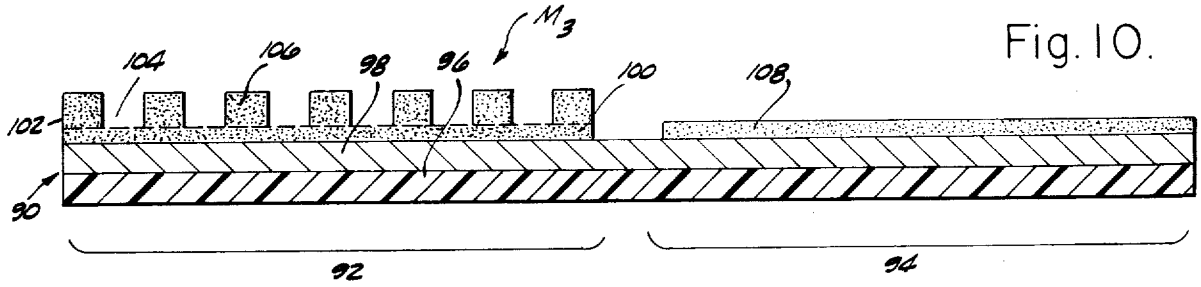
FIG. 10 is a vertical sectional view showing a method of forming another modified form of magnetic storage device constructed in accordance with and embodying the present invention.
Figure 11:
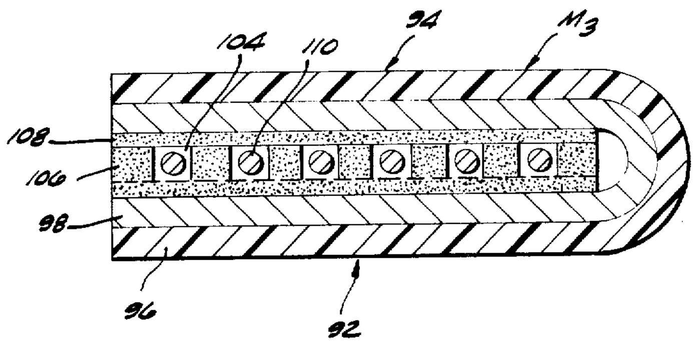
FIG. 11 is a vertical sectional view of the magnetic storage device produced in accordance with the method illustrated in FIG. 10.

Another modified form of magnetic memory device, $M_3$, which is more fully illustrataed in FIGS. 10 and 11, is also provided in accordance with the present invention and which may be similar in construction to the magnetic memory device $M_1$, or the magnetic memory device $M_2$. The magnetic memory device $M_3$ comprises a single circuit board 90 which includes a substrate section 92 and a cover member section 94. The circuit board 90 used in this embodiment of the invention is similar to the circuit board 20 and is formed of a plate 96 having on its upwardly presented planar surface a plurality of parallel spaced-apart longitudinally extending conductors 98 which serve as word straps.

The left-hand portion of the circuit board, reference being made to FIG. 10, essentially comprises the substrate section 92 and is provided with a first coating 100 of photo-resistive material which is exposed to the source of radiation for a relatively short time period and thereby partially set. A second coating 102 of the photo-resist material is applied to the partially set first coating 100 and is exposed to radiation through a mask and treated in the manner previously described in order to form the spaced-apart parallel transversely extending tunnels 104 separated by the parallel spaced-apart transversely extending ridges 106. Again, it can be observed that the ridges 106 and the respective tunnels 104 defined thereby extend in a direction substantially perpendicular to the word strap conductors 98. The right-hand portion of the circuit board 90 which constitutes the cover member section 94 is similar to and is fabricated in a manner substantially similar to the fabrication of the cover member 38, as illustrated in FIG. 8. Thus, the upper surface of the circuit board 90 in the cover member section 94 is provided with a photo-resistive coating 108 and partially set by exposure to ultra-violet radiation. Immediately thereafter, the cover member section 94 is folded over the substrate section 92 in the manner as illustrated in FIG. 11, and the photo-resistive coating 108 is bonded to the upper surfaces of the ridges 106 to thereby define the tunnels 104. Again, magnetically coated conductive elements which serve as driving lines 110 are inserted in each of the tunnels 104.

It can be observed that in this form of construction, only photographic type equipment and processing is required, drilling of the holes and the insertion of electrically conductive elements to electrically connect the upper and lower word straps is thereby eliminated. This, in turn, eliminates any problems of contamination of the photographic resist material by bits of metal, plating solutions and the like.

These memory devices mentioned above each constitute a memory plane which may be used in a memory system, or so-called "memory section". In many cases, a plurality of these memory planes are used in any one memory section. A typical memory section may include a bottom cover plate fitted with an electrically insulative shield and an outboard memory plane, such as the memory device of the present invention. Another memory device which serves as an inboard memory plane is included between a shield covering the outboard memory plane and a stiffener member preferably formed of a metal such as beryllium. The upper portion of the memory section comprises a similar structure including another inboard memory plane covered by an electrically insulative shield, an outboard memory plane which is also covered by an electrically insulative shield and a top cover plate. The top cover plate can typically be secured to the bottom cover plate by any conventional means in order to form the assembled memory section.

The reliability and high accuracy inherent in extant photographic techniques enable the making of tunnel containing structures which are quite superior to devices containing a plurality of spaced-apart tunnels prepared in accordance with other prior art techniques. The variability of process parameters which are inherent in the other prior art techniques discussed above are not encountered when using primarily the photographic techniques of the present invention. Furthermore, relatively low tooling costs are involved in the making of the subject tunnel containing structures.

Thus there has been illustrated and described novel tunnel containing structures and method of making same which permits the fabrication of the structures primarily with photographic techniques, thereby eliminating problems of reproducability and accuracy inherent in other prior art techniques. Accordingly, these tunnel containing structures and methods of making the same fulfills all of the objects and advantages sought therefor. Many changes, modifications, variations and other uses and applications of the subject tunnel containing structures and methods of making the same will become apparent to those skilled in the art after considering this specification and the accompanying drawings. Therefore, all such changes, modifications, variations and other uses and applications which do not depart from the nature and principal of our invention are deemed to be covered by the invention which is limited only by the following claims.

Having thus described our invention, what we desire to claim and secure by Letters Patent is:

1. The method of making a three dimensional structure of selected size in each dimension formed of a polymerizable radiation activatable material, said method comprising:

a. depositing a first layer of a radiation active material on a substrate, b. exposing said first layer to a source of radiation having a spectral distribution compatible with the spectral response of said radiation active material to only partially activate said layer, c. immediately thereafter depositing a second layer of radiation active material on said first layer to permit co-polymerization of said two layers between the interface therebetween to thereby permanently bond said two layers, d. baking said structure to homogenize the interface between said layers, e. selectively exposing selected portions of said second layer to a source of radiation having a spectral distribution compatible with the spectral response of said material in said second layer, f. and treating said last named layer with an agent capable of removing the portions thereof not exposed to the source of radiation so as to remove the non-exposed portions leaving the selected exposed portions.

2. The method of making the structure of claim 1 further characterized in that the method includes bonding an additional member to an exposed surface of said second layer parallel to the surface of the substrate.

3. The method of making the structure of claim 1 further characterized in that the second layer is exposed to said source of radiation through a mask which permits exposure of only said selected portion.

4. The method of making the structure of claim 1 further characterized in that the treating of the material comprises washing the material in a solvent so that the unexposed portions are washed away.

5. The method of making a device having a plurality of spaced apart tunnels therein, said method comprising:

a. coating a radiation active resist material on one planar surface of a substrate having a pair of opposite planar surfaces;

b. exposing a plurality of spaced apart selected areas of said resist material to a source of radiation, c. treating the resist material with an agent capable of removing portions thereof not exposed to the source of radiation to thereby form a plurality of spaced apart recesses separated by a plurality of spaced apart ridges and in which said recesses have walls extending between said ridges which are substantially parallel to the first named planar surface, d. coating a material capable of bonding action on one planar surface of a cover member, e. and bonding said cover member to the outwardly presented surface of said ridges through the material capable of bonding action to form tunnels with said recesses.

6. The method of claim 5 further characterized in that the coating of radiation active resist material on the substrate is accomplished by applying a first layer of such material to the planar surface of said substrate and exposing said first layer to said source of radiation to effect only partial activation thereof, and a second layer of radiation active resist material is thereafter applied to said partially activated first layer, whereby copolymerization occurs between the two layers to effect bonding therebetween, said device then being baked to homogenize the interface between said layers.

7. The method of claim 6 further characterized in that said second layer is exposed to said source of radiation through a mask which permits exposure of only said selected spaced apart areas.

8. The method of claim 5 further characterized in that, said cover member is integral with and initially substantially coplanar with said substrate and folded over and bonded to said ridges after coating with said resist material and exposure to cause partial activation thereof.

9. The method of claim 5 further characterized in that the material capable of bonding action is a radiation active resist material and the last named coating is exposed to a source of radiation to cause partial activation thereof immediately prior to bonding whereby copolymerization occurs between the last named coating and the material of said ridges.

10. The method of claim 7 further characterized in that the method includes the applying of heat and pressure to the ridges and cover member during the bonding operation.

11. The method of fabricating a magnetic memory device comprising:

a. coating a radiation active resist material on one planar surface of a substrate also having a plurality of electrical conductors located with respect to one planar surface thereof, b. exposing a plurality of spaced apart selected areas of said resist material to a source of radiation in such manner that the exposed selected areas are angularly located with respect to said electrical conductors, c. treating the resist material with an agent capable of removing portions thereof not exposed to the source of radiation to thereby form a plurality of spaced apart recesses separated by a plurality of spaced apart ridges and in which said ridges are substantially parallel to the first named planar surface and angularly located with respect to the electrical conductors, d. bonding a cover member having a plurality of electrical conductors thereon to the surfaces of said ridges parallel to said substrate planar surface to form tunnels with said recesses, so that respective ones of the conductors on said cover member and substrate are in substantial registry and capable of being in electrical contact, e. and inserting electrically conductive elements in said tunnels.

12. The method of claim 11 further characterized in that the surface of the cover member which is bonded to the surfaces of said ridges is first coated with a radiation active resist material and exposed to a source of radiation to cause partial activation thereof prior to bonding to said ridges, whereby copolymerization occurs at the interface between the ridges and the last mentioned resist material.

13. The method of claim 11 further characterized in that the radiation active resist material is applied to a planar surface of said substrate which is opposite to the planar surface on which said electrical conductors are located.

14. The method of claim 11 further characterized in that the electrical conductors on said cover member are located on one planar surface thereof and that the opposite planar surface of said cover member is first coated with a bondable material so that said cover member is bonded to the surfaces of said ridges parallel to said substrate surface through said bondable material.

15. The method of claim 14 further characterized in that the electrical conductors on said cover member are located with respect to one planar surface thereof and that the same planar surface of said cover member is first coated with a bondable material so that said cover member is bonded to the surfaces of said ridges through said last named coating of bondable material, and the radiation active resist material applied to said substratee is applied to the same planar surface on which said electrical conductors are located.

16. The method of claim 12 further characterized in that said cover member is integral with and initially substantially coplanar with said substrate and folded over and bonded to said ridges after coating with said resist material and exposure thereof.

* * * * *